United States Patent [19]

Hammer et al.

[11] Patent Number: 5,246,648
[45] Date of Patent: Sep. 21, 1993

[54] PRODUCTION OF SINTERED DOLOMITE IN A ROTARY KILN

[75] Inventors: Thomas Hammer, Iserlohn-Letmathe; Heinzjosef Poggenpohl, Hagen-Halden; Herbert Richrath, both of Hagen; Alfred Roeder, Duisburg, all of Fed. Rep. of Germany

[73] Assignee: Dolomitwerke GmbH, Wülfrath, Fed. Rep. of Germany

[21] Appl. No.: 398,705

[22] Filed: Aug. 25, 1989

[30] Foreign Application Priority Data

Aug. 26, 1988 [DE] Fed. Rep. of Germany ....... 3828997

[51] Int. Cl.$^5$ ............................................. C04B 35/04
[52] U.S. Cl. ...................................... 264/56; 264/37; 264/57; 264/64; 501/112; 501/113
[58] Field of Search ................. 264/37, 56, 64, 57; 501/112, 113

[56] References Cited

U.S. PATENT DOCUMENTS

| 4,394,454 | 7/1983 | Rosener et al. | 501/112 |
|---|---|---|---|
| 4,626,198 | 12/1986 | Cohen | 432/13 |
| 4,627,948 | 12/1986 | Zepter et al. | 264/56 |

FOREIGN PATENT DOCUMENTS

| 0066278 | 8/1914 | Austria . |
| 1132780 | 10/1982 | Canada . |
| 1179692 | 12/1984 | Canada . |
| 0359997 | 3/1990 | European Pat. Off. . |
| 1646918 | 7/1972 | Fed. Rep. of Germany . |
| 2203413 | 8/1972 | Fed. Rep. of Germany . |
| 2553001 | 6/1977 | Fed. Rep. of Germany . |
| 2819038 | 11/1979 | Fed. Rep. of Germany . |
| 3118481 | 11/1982 | Fed. Rep. of Germany . |
| 3209836 | 9/1983 | Fed. Rep. of Germany . |
| 973947 | 11/1964 | United Kingdom . |
| 1385962 | 3/1975 | United Kingdom . |

*Primary Examiner*—James Derrington
*Attorney, Agent, or Firm*—Nils H. Ljungman and Associates

[57] ABSTRACT

Method for the production of sintered dolomite, wherein at least carbonate material is ground into particles, formed into a predetermined shape, such as briquettes, deacidified and then heated to a predetermined temperature.

4 Claims, No Drawings

PRODUCTION OF SINTERED DOLOMITE IN A ROTARY KILN

BACKGROUND OF THE INVENTION

1. Field of the Invention

The present invention provides a method for the production sinter dolomite, whereby primarily carbonate raw materials are ground, pressed into a predetermined shape, such as briquettes, an then sintered.

2. Description of the Prior Art

Sintered dolomite may serve as the refractory basic material for the production of basic refractory bricks. For the production of high grade refractory bricks, the sinter has, as primary requisites, a low amount of contamination from foreign oxides, for example, which is less than 3.5%, and a high density, for example, which is a raw density which is greater than 3.15 g/cm$^3$. Known procedures, such as a procedure according to Austrian Patent No 66278, call for the burning of magnesite which has been pre-deacidified in a rotary kiln. This procedure, however, produces a very uneven sinter, due to the degree of burning and, therefore, cannot be used for the sintering of dolomite which meets the above-mentioned requirements.

If one starts with raw dolomite gravel with a grain size between approximately 6 mm and 30 mm and heats it at a temperature which is greater than 2000° C., a raw density of the sinter dolomite of approximately 3.20 g/cm$^3$, with a contamination by foreign oxides of less than 3.5%, can be achieved Raw materials, which can be sintered only with difficulty, will be deacidified only with a first burn such as that described in German Patent No. 31 18 481. After the first passage through the kiln, the raw material is then graded and compacted and is then sintered in a second passage through the kiln. The expenditure in energy is somewhat large because of the required high temperatures and the two stage burning. During the preparation of raw dolomite gravel, there are substantial amounts of raw dolomite sand with a grain size of less than 6 mm. It is not possible to compact the necessarily produced grains in a direct manner.

A further lowering of the lower size limit for the gravel is not permitted because of the otherwise increasing aerodynamic resistance of the fill at the Lepol grate which is, normally, attached to the rotary kiln and ahead of the entry to the kiln as recited, for example, in German Patent Publication for Opposition Purposes No. 16 46 918.

Furthermore, during the dust removal from the rotary kiln, a fine-grained filter dust is encountered which contains primarily oxides and has an upper limit of the grain spectrum of about 0.5 mm. This oxide filter dust can, however, be turned into briquettes and can be sintered, but the obtainable raw density of the sinter dolomite briquettes is too low since it is at a level of less than 3.10 g/cm$^3$. These residues, from the typical production methods of sinter dolomite from raw dolomite gravel, now have to be used in some other manner or else have to be disposed of.

German Laid Open Application No. 32 09 836 describes how to provide ground raw dolomite with additives and how to make briquettes which are then deacidified and sintered in a shaft kiln It is possible to add additives in a planned fashion and to receive valuable sinter dolomite in one single passage through the shaft or pit furnace. This procedure is limited to being performed in a shaft or pit furnace because of the brittle characteristics of the briquette. The briquettes have, at the temperature level at which a deacidification takes place, a very high porosity which can be up to 60%. The rotary kiln, by comparison to the shaft or pit furnace, has a higher mechanical or abrasive wear and tear. Briquettes could not be made from, primarily, carbonate raw material because they would become destroyed. Even if one, as suggested in German Laid Open Patent Application No. 25 53 001, uses finely ground raw materials prepared by flotation and increases the press pressure for the formation of the mold, it is not possible to obtain a sinter raw density of greater than 3.2 g/cm$^3$ with dolomite. Even the procedure for the production of briquette sinter, according to German Patent No. 31 18 481, cannot succeed without the addition of additives to the raw dolomite.

OBJECTS OF THE INVENTION

An object of the invention is to increase the strength of the briquettes, thereby reducing brittleness prior to their delivery into a rotary kiln so that the procedure, described earlier, can be accomplished in a rotary kiln at a temperature up to 2000° C.

Another object of the invention is that a briquette-sintered dolomite, with a raw density of greater than 3.20 g/cm$^3$, can be achieved with the contamination of foreign oxides within the sinter dolomite being less than 3.5%.

SUMMARY OF THE INVENTION

The invention resides broadly in a method for the production of dolomite comprising the steps of providing material which includes at least a carbonate material, grinding the material into particles, forming a group of the particles into a predetermined shape, applying a deacidizing process to the shaped group of particles and heating the shaped group of particles.

It is advantageous that, with raw materials that are ground very fine, the percent of grains with a grain size of less than 0.09 mm be more than 70%. This will achieve a homogenization of the raw materials and a high, raw density of the sinter briquettes.

It is, furthermore, advantageous that the briquettes be heated to a temperature of at least 1000° C. prior to their delivery into the rotary kiln. That is at least 100° C. above the temperature required for the complete deacidification of calcium carbonates. Therefore, with the use of carbonate raw materials, a strength of the briquettes is being achieved so that they virtually do not get destroyed in the rotary kiln.

Raw dolomite or a mixture of raw dolomite with raw magnesite and/or calcite can be used as the raw material. A change of the MgO-CaO ratio can be obtained depending on the use. Bonding agents, such as oxides and/or hydroxides of calcium and/or magnesium, can be added to the raw materials. As an addition, oxide filter dust can also be used.

It is especially advantageous to grind the components of the raw material together. It has been found that the process of combined grinding results in the achievement of a higher raw density sinter, compared to a separate grinding and subsequent mixture of the components.

An advantageous development of the invention can consist in the fact that raw dolomite sand, with a grain size of less than 6 mm, can be mixed with an oxide filter dust and the combined mixture can be finely ground. Through this procedure, it is possible to utilize the residue from the customary production of sinter dolomite from raw dolomite gravel within a rotary kiln for the production of a very valuable briquette-sintered dolomite.

With the procedure according to the invention, it is furthermore possible to utilize finely ground raw materials in a rotary kiln as the initial or basic substance.

The economic advantage of the production of briquette-sintered dolomites in a rotary kiln consists generally of the fact that a rotary kiln has a much higher charge per kiln unit. By contrast, the shaft or pit furnace can only hold a limited charge. The advantage of smaller specific consumption of energy by the shaft or pit furnace is therefore overcompensated.

A preferred embodiment of the invention will be described with respect to, but is not limited to, the following example of the joint processing of gravel and fine raw materials which have been into briquettes.

DESCRIPTION OF THE PREFERRED EMBODIMENTS

The rotary kiln installation consists of a rotary kiln which is approximately 110 meters long and is slightly inclined and which has a diameter of approximately 4.4 meters. Located in front of the rotary kiln is a Lepol grate which is provided for the purpose of deacidizing the raw stones. Beyond the rotary kiln, there is a thrust grating cooler.

A mixture consisting of dust from bituminous coal and lignite coal is burnt at a temperature of between 1800° C.-2000° C., since at least that temperature is required for the sintering to be achieved within the rotary kiln. The hot exhaust gases leaving the rotary kiln are sucked from below through the fill on the Lepol grate by means of blowers which have electrostatic precipitation filters. In the discharge side of the grate, shortly before the infeed side of the rotary kiln, the fill reaches a bed temperature up to 1300° C. through the employment of an auxiliary fire, so that the deacidification of the raw material is, practically, concluded. The grain arriving at the Lepol grate is of a dimension from 6 mm to 32 mm. Judged by a customary operating level, the charge of gravel consists of 60 t/h, which corresponds to sinter performance of approximately 30 t/h.

The relative composition of the raw material, which may be substantially unprocessed dolomite sand, is as follows:

| | | |
|---|---|---|
| CaO | 61.0% | |
| MgO | 37.5% | |
| SiO | 0.5% | |
| $Fe_2O_3$ | 0.6% | |
| $Al_2O_3$ | 0.3% | |
| $Mn_3O_4$ | 0.1% | |

The annealing loss varies considerably between the raw dolomite sand and the oxide filter dust. The annealing loss of the carbonate raw dolomite sand is approximately 47% because of the high C02 content and the annealing loss of the oxide filter dust is approximately 10% because of its residual C02 and H20.

The first step of the process of the invention entails the raw dolomite sand and the oxide filter dust to be both mixed in a bowl-shaped or ball mill, and ground. The mass relationship is 10 to 40 parts oxide filter dust to 90 to 60 parts raw dolomite sand and, preferably, 30 parts oxide filter dust to 70 parts raw dolomite sand. After the joint grinding, the contents of the raw powder mixing, in terms of grain size, contain at least 75% of grains with a size of less than 0.09 mm.

In the second step, the raw mixture is pressed or formed into a predetermined shape, such as briquettes, by a briquette press, with a recycling for the sifted-out pieces which have a size below 10 mm. The net performance of the press is approximately 10 ton of green briquettes per hour. The briquettes have a pillow form and a volume of approximately 10 cubic centimeters.

The third step includes deacidification and sintering. Here, the green briquettes are moved evenly by a conveyor over the Lepol grate to the rotary kiln. The briquettes cover the fill of the Lepol grate and may be heated to a temperature above 1200° C. They are then deacidified and the strength is increased to a point that the briquettes will not be destroyed later on in the rotary kiln. The sintering within the rotary kiln takes place at a temperature of approximately 2000° C.

The briquette-sintered dolomite produced according to the above mentioned examples, done with both sinter dolomite and raw dolomite gravel, has a raw density of 3.28 $g/cm^3$ with a contamination of foreign oxides of about 2.5% of proportion of mass and a porosity of about 4.2% portion of volume.

In summing up, the procedure for the production of sintered dolomite, in which procedure primarily carbonate raw materials are ground, pressed into briquettes, and are subsequently sintered, is characterized by the fact that (a) the raw material is ground very fine, and (b) briquettes are formed which (c) are entered through a deacidizing device and are environmentally safely heated to a calcination temperature before they enter the rotary kiln.

The procedure is characterized by the fact that the raw material has been ground very fine and that the share of granulars with a granular size of less than 0.09 mm consists of more than 70%.

The procedure has been characterized by the fact that the briquettes will be heated to a temperature of at least 1000° C before they are entered into the rotary kiln.

The procedure is characterized by the fact that the raw material used consists of raw dolomite or a mixture of raw dolomite with raw magnesite and/or calcite.

The procedure is characterized by the fact that the raw material receives additions of oxides and/or hydroxides of calcium, and/or magnesium.

The procedure is characterized by the fact that oxide filter dust is used as an additive.

The procedure is characterized by the fact that all components of the raw material are jointly mixed.

The procedure is characterized by the fact that the raw dolomite sand with a granular size less than 6 mm is mixed with oxide filter dust and together, both are finely ground.

Patents relating to the production of sintered dolomite in a rotary kiln include U.S. Pat. No. 4,193,556, entitled "Hammer Mill", and U.S. Pat. No. 4,626,198, entitled "Method and Apparatus For Producing Dead Burnt Materials."

All patents, patent applications, publications and/or document recited herein are hereby incorporated by reference as if set forth in their entirety herein.

The invention as described hereinabove in the context of a preferred embodiment is not to be taken as limited to all of the provided details thereof, since modifications and variations thereof may be made without departing from the spirit and scope of the invention.

We claim:

1. A method for the production of sintered dolomite in a rotary kiln, said method comprising:
   providing at least a carbonate material;
   grinding said at least a carbonate material to produce reduced size particles of said at least a carbonate material;
   pressing a group of the reduced size carbonate material particles into a predetermined shape;
   moving said shaped group of particles evenly by a conveyor through deacidizing apparatus;
   heating said shaped group of particles in said deacidizing apparatus to deacidize and calcine said shaped group of particles to strengthen said shaped group of particles; and
   heating said deacidized shaped group of particles in said rotary kiln.

2. The method according to claim 1, wherein said grinding further includes:
   adding at least one bonding agent to said at least a carbonate material, said bonding agent for bonding said at least one carbonate material; and
   grinding said at least a carbonate material and said at least one bonding agent together to form a mixture of reduced size particles of the materials.

3. The method according to claim 2, wherein:
   said at least a carbonate material component comprises a member selected from the group consisting of: a) dolomite, b) magnesite, c) calcite, and d) combinations of members of the group; and
   said at least one bonding agent comprises a member selected from the group consisting of: a) calcium oxide, b) calcium hydroxide, c) magnesium oxide, d) magnesium hydroxide, and e) combinations of members of the group.

4. The method according to claim 3, wherein:
   said grinding is done in at least one of: a bowl shaped mill and a ball mill;
   at least 70% of said reduce size particles have a dimension of less than about 0.09 millimeters after said grinding;
   said pressing a group of the reduced size particles into a predetermined shape comprises forming a briquette of said particles;
   said deacidizing includes the step of heating said shaped group of particles to at least about 1000° C.; and
   said heating said deacidized shaped group of particles comprises heating said deacidized shaped group of particles to a temperature of at least 1800° C. in the rotary kiln.

* * * * *